United States Patent [19]

Tung et al.

[11] Patent Number: 4,712,868
[45] Date of Patent: Dec. 15, 1987

[54] EXPANDED RETROREFLECTIVE SHEET MATERIAL

[75] Inventors: Chi F. Tung, Mahtomedi; James C. Coderre, White Bear Lake, both of Minn.

[73] Assignee: Minnesota Mining and Manufacturing Company, St. Paul, Minn.

[21] Appl. No.: 778,806

[22] Filed: Sep. 23, 1985

[51] Int. Cl.[4] .................. G02B 5/128; G02B 5/124; G02B 17/00
[52] U.S. Cl. .................. 350/105; 350/103; 350/442
[58] Field of Search ............. 350/102, 103, 104, 105, 350/106, 409, 442, 109

[56] References Cited

U.S. PATENT DOCUMENTS

| 2,310,790 | 2/1943 | Jungersen | 88/105 |
|---|---|---|---|
| 2,326,634 | 8/1943 | Gebhard et al. | 88/82 |
| 2,697,832 | 4/1951 | Stich | 2/87 |
| 3,069,796 | 11/1958 | Ruter | 41/10 |
| 3,442,275 | 5/1969 | Ternes | 135/5 |
| 3,453,039 | 7/1969 | Osborne | 350/260 |
| 3,582,108 | 6/1971 | Carlton | 280/154.5 |
| 3,703,432 | 11/1972 | Koski | 161/110 |
| 3,716,445 | 2/1973 | Lemelson | 350/102 |
| 3,790,431 | 2/1974 | Tung | 350/105 |
| 3,836,226 | 9/1974 | Cechetini | 350/105 |
| 3,922,433 | 11/1975 | Patterson et al. | 350/105 |
| 3,985,599 | 10/1976 | Lepoutre et al. | 156/164 |
| 4,023,889 | 5/1977 | Eagon et al. | 350/105 |
| 4,025,159 | 5/1977 | McGrath | 350/105 |
| 4,323,605 | 4/1982 | Rush | 428/17 |
| 4,347,284 | 8/1982 | Tsutomu et al. | 428/328 |
| 4,367,920 | 1/1983 | Tung et al. | 350/105 |

Primary Examiner—John K. Corbin
Assistant Examiner—Vincent J. Lemmo
Attorney, Agent, or Firm—Donald M. Sell; James A. Smith; Roger R. Tamte

[57] ABSTRACT

Retroreflective sheet material capable of retroreflecting light at high incidence angles is prepared by laminating retroreflective sheeting to a base sheet, slitting the laminated sheet assembly in an array of spaced discontinuous slits, and expanding the laminated sheet assembly so that openings occur at the slits and portions of the laminated sheet assembly between the slits bend out of the plane which they originally occupied.

5 Claims, 7 Drawing Figures

EXPANDED RETROREFLECTIVE SHEET MATERIAL

BACKGROUND OF THE INVENTION

Many retroreflective articles (which return light along substantially the same path that the light traveled to the article) would benefit from the ability to retroreflect light that impinges on the article over a wide range of angles. For example, when a retroreflective article extends in the direction of travel along a roadway, light from an oncoming vehicle strikes the article at a very high incidence angle (the angle between the light and a line perpendicular to the article). Most existing retroreflectors, such as the reflective sheeting used on traffic control signs, do not brightly retroreflect light striking the sheeting at such very high incidence angles.

SUMMARY OF THE INVENTION

The present invention provides a new reflective sheet material which retroreflects light that is incident on it over a wide range of angles, including very high incidence angles, as well as zero-degree incidence angle light (i.e., light that is perpendicular to the plane of the sheeting). This new sheet material can be used in a number of different ways, but one preferred use is to mount it alongside a roadway as a fence that can both serve as a glare screen and provide delineation for the roadway. Briefly, the new sheet material comprises retroreflective sheeting laminated to a base sheet, with the laminated sheet assembly being slit in an array of spaced discontinuous slits and expanded so that openings occur at the slits. Portions of the laminated sheet assembly between the slits bend or twist out of the plane they originally occupied, whereby the retroreflective sheeting is aligned to reflect over a wide range of angles. Various forms of retroreflective sheeting can be used, including (1) sheeting that comprises a monolayer of transparent microspheres and a layer of specularly reflective material underlying the microspheres and (2) sheeting that comprises cube-corner retroreflective elements.

DETAILED DESCRIPTION

Figure 1:
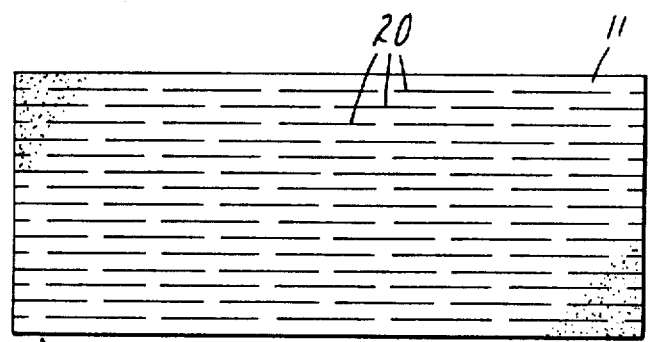
FIG. 1 is a top view of an intermediate product prepared in the course of preparing a representative sheeting of the invention.
Figure 2:
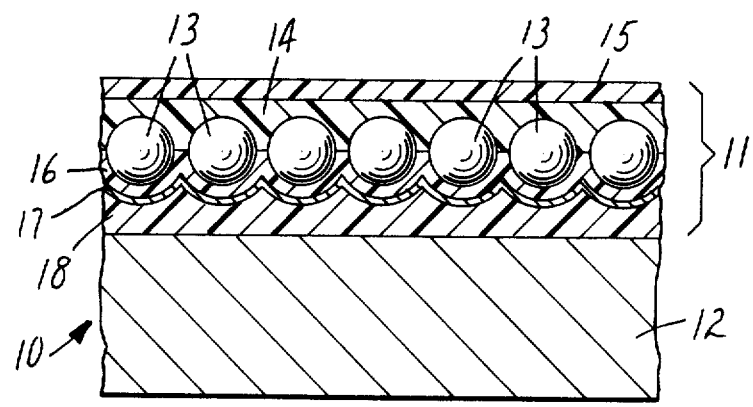
FIG. 2 is an enlarged sectional view through the intermediate product shown in FIG. 1.
Figure 3:
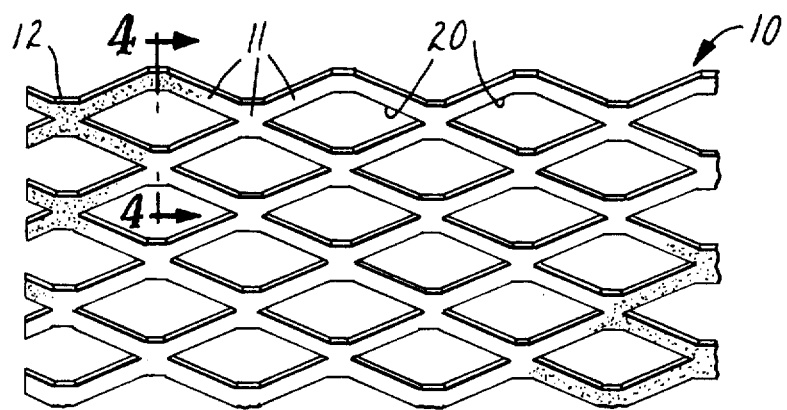
FIG. 3 is a top view of a completed representative sheeting of the invention.

FIGS. 1-4 show a representative sheet material of the invention 10 in various stages of preparation and from different points of view. The sheet material is typically prepared by first laminating a retroreflective sheeting 11 to a base sheet 12 to form an intermediate product such as illustrated in FIGS. 1 and 2. A shown in FIG. 2, a typical and preferred retroreflective sheeting 11, known as embedded lens sheeting, comprises a monolayer of transparent microspheres 13 covered on the front or top with a flat-surfaced layer 14 and cover film 15, and covered on the bottom by a spacing layer 16, which is conformed to the microsphere surface. The layers 14, 15, and 16 are made from transparent polymeric materials such as alkyd resins or acrylic resins. A specularly reflective layer 17, preferably vapor-deposited aluminum, covers the conformed surface of the spacing layer 16, and a layer of adhesive 18 is coated over the specularly reflective layer. The adhesive can be a pressure sensitive, heat-activated, or solvent-activated adhesive. For purposes of the invention, heat-activated adhesives are generally preferred.

Figure 7:
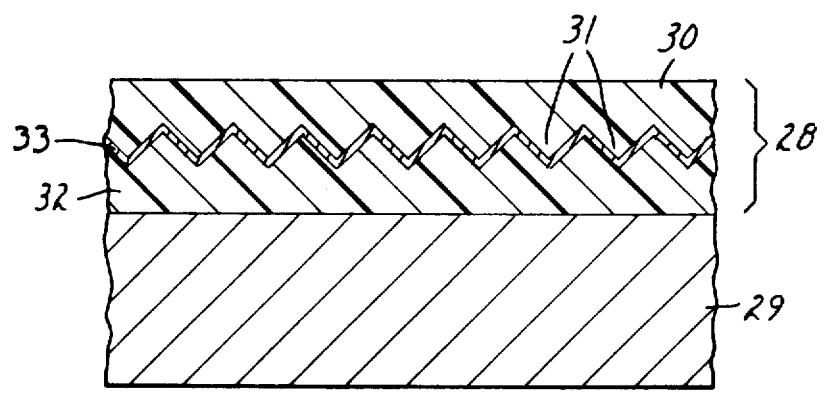
FIG. 7 is an enlarged sectional view like the view shown in FIG. 2 through another representative product of the invention.

Other forms of retroreflective sheeting may also be used, including reflective sheeting as described in U.S. Pat. No. 4,367,920; exposed lens microsphere-based reflective sheeting as described in U.S. Pat. No. 2,326,634, and cube-corner reflective sheeting as taught in U.S. Pat. No. 2,310,790 (especially forms in which the cube-corner surface is metallized and an adhesive is coated on the metallized surface). A representative cube-corner reflective sheet material of the invention is shown in Figure 7. The sheet material includes a cube-corner sheeting 28 such as described in FIG. 7 of U.S. Pat. No. 2,310,790. That sheeting comprises a transparent film 30 formed on its back surface with cube-corner elements 31, which are covered with a layer of metal 33. A layer of adhesive 32 covers the metal and adheres the material to a base substrate 29.

The base sheet 12 to which the retroreflective sheeting is laminated can be a variety of materials such as steel or aluminum sheet, sheets of engineering plastics or reinforced plastics, an elastomeric substrate such as polyurethane or styrene-butadiene rubbers, or a fabric such as canvas or rubberized canvas. The base sheet may be coated or primed to improve its adhesion to the retroreflective sheeting, to improve its weatherability, or for other reasons.

Retroreflective sheeting is often applied on both sides of the base sheet to provide a sheet material that is retroreflective on both sides.

After lamination, the intermediate product is slit with an array of slits 20 which are discontinuous and separated from one another. The slits are generally in a parallel pattern and located so that when the sheet material is expanded or stretched, a mesh-like structure is formed with the slit areas forming openings in the mesh. In some operations, the slitting tool is designed to expand the sheeting during the slitting operation, so that the sheeting is simultaneously slit and expanded. In other operations, expanding is performed subsequent to slitting. The slits are preferably in an ordered pattern so that a uniform mesh is formed.

Figure 4:
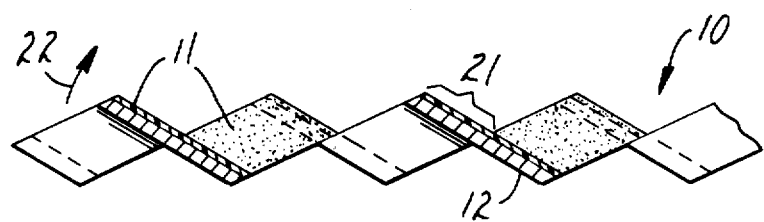
FIG. 4 is a sectional view through a portion of sheet material of the invention taken along the lines 4—4 in FIG. 3.
Figure 5:
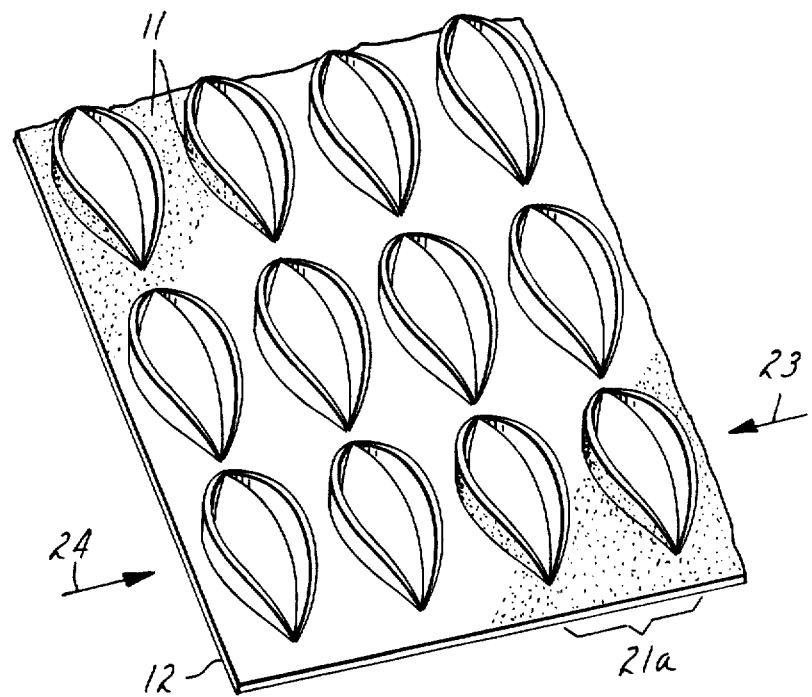
FIG. 5 is a perspective view of an alternative sheet material of the invention.

As shown in FIG. 4, after expansion, portions 21 of the sheet material between slits become twisted or bent about 45°. Different portions are twisted different amounts, with some portions being essentially untwisted or unbent, which means that the sheet material will retroreflect through a wide range of incidence angles. Twisting or bending can occur in a single angular direction; i.e., as shown in FIG. 4, all the portions 21 are twisted in the direction of the arrow 22.. Alternatively, the portions between slits may be twisted or bent in different directions. In one alternative, shown in FIG. 5, a single portion 21a between slits is bent in two directions. Sheet material having two different directions of bending has the advantage that it offers better reflection in two directions of viewing, e.g., the two directions represented by the arrows 23 and 24 in FIG. 5.

The spacing between the slits may vary depending upon the intended use for the sheet material and the strength of the sheet material. For use as a glare screen alongside a roadway, the spacing should be such that when viewed at a 45° angle, the sheet material blocks visibility. However, the sheet material should be sufficiently open so that viewers looking through the sheet material at a 0° incidence angle, i.e., perpendicularly to the sheet material, can see through the sheet material.

After slitting and expanding, it may be desirable to coat the sheet material with a transparent polymeric film-forming material so as to seal the cut edges of the sheeting and function as a protective coating for the sheeting.

Figure 6:
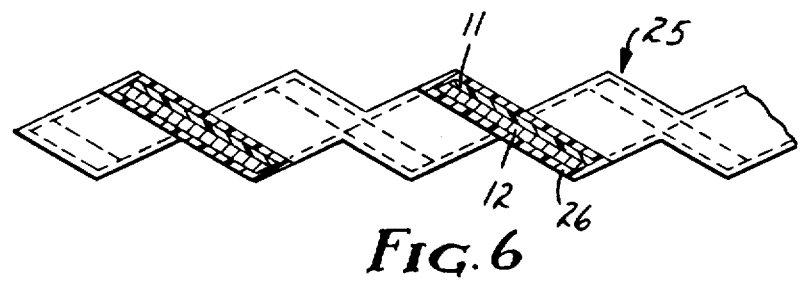
FIG. 6 is a sectional view like the view shown in FIG. 4 through a portion of a different sheet material of the invention.

FIG. 6 is a cross-sectional view showing such a coated sheeting 25, comprising a sheet material as shown in FIG. 4 including a retroreflective sheeting 11 laminated to a base sheet 12 slit and stretched in the manner shown in FIG. 4 and then coated with a coating material 26. Also, the coating may complete the optics of the system (e.g., the top coat may provide the top layer of sheeting such as discussed in FIG. 6 of U.S. Pat. No. 4,367,920). Useful polymers for such a coating include acrylics, epoxies, and silicones or blends thereof. The polymers may be applied from a solution, e.g., by spraying or dipping the sheet material. In some cases, the sheet material may be encased completely in a continuous solid film whereupon the retroreflective sheeting is further protected from contact. For example, such an encased sheet material can be used as a pavement marking on a roadway and the retroreflective sheeting is protected from contact by the wheels of vehicles traveling on the roadway. Since the retroreflective sheeting includes twisted portions, high-incidence-angle light from oncoming vehicles would be retroreflected. The sheet material may be wrapped around a barrel and will reflect over its full length.

In the case of a pavement-marking sheet material or tape, the spacing between the slits should be rather narrow, such as on the order of 0.5 to 3 millimeters, so that in their twisted form they still allow the sheet material to have a minimum thickness.

Sheet material prepared using fabric as a substrate can form light-weight, portable reflective barricades. Normally, the sheet material can be expanded ½ to 3 times its original width after it has been slit.

A legend can be applied to sheet material of the invention, typically before slitting, whereupon the sheet material may present a message. For example, such a legend-bearing sheet material can be used as a sign in areas that experience high wind, with the wind pressure being reduced because of the openings through the sheet material of the invention.

Another use of sheet material of the invention is on signs at a curve on a roadway. Due to the broad angularity of the sheet material (i.e., the ability to reflect through a wide range of incidence angles), the sign can be visible even as motorists travel around the curve.

Sheet material of the invention can be mounted at certain locations, such as in a tunnel, where space is too limited to install a regular traffic control sign. Because portions of the sheet material are twisted, the sheet material can present a message that is viewable and legible even though the sign is disposed at an angle of 45° or 60° to the direction of traffic.

The sheet material of the invention will be further illustrated by the following example. An embedded-lens retroreflective sheeting available from 3M as "Scotchlite" Brand Commercial Grade, Reflective Sheeting, No. 850, which exhibits 100 percent elongation at break and carries a heat-activated adhesive, was laminated to a 0.125-inch-thick (3-millimeter-thick) steel substrate by heat lamination. The composite sheet assembly was then slit and expanded two to three times its original length on a conventional expanding machine. Thereupon, the slit and expanded sheet material was clear-coated by dipping in an alkyd resin solution.

When mounted alongside a roadway, the sheet material formed a glare screen which prevented light from the headlights of oncoming traffic in the opposite lane from blinding approaching drivers and which also provided reflection to assist drivers to determine their position in the lane of travel.

We claim:

1. Retroreflective sheet material comprising retroreflective sheeting laminated to a base sheet, the retroreflective sheeting being selected from (1) sheeting that comprises a monolayer of transparent microspheres and a layer of specularly reflective material underlying the microspheres and 2) sheeting that comprises cube-corner retroreflective elements; the laminated sheet assembly being slit in an array of spaced discontinuous slits; and the laminated sheet assembly being expanded so that openings occur at the slits, and portions of the laminated sheet assembly between the slits bend out of the plane they originally occupied.

2. Retroreflective sheet material of claim 1 in which the laminated sheet assembly is covered with a transparent polymeric layer that seals the slit edges of the retroreflective sheeting.

3. Retroreflective sheet material of claim 2 in which the transparent polymeric layer is continuous and closes the openings that occur at the slits.

4. Retroreflective sheet material of claim 1 in which the retroreflective sheeting includes a layer of transparent material covering the monolayer of transparent microspheres.

5. Retroreflective sheet material of claim 1 in which retroreflective sheeting is laminated to both sides of the base sheet.

* * * * *

UNITED STATES PATENT AND TRADEMARK OFFICE
CERTIFICATE OF CORRECTION

PATENT NO. : 4,712,868

DATED : December 15, 1987

INVENTOR(S) : Chi Fang Tung et al

It is certified that error appears in the above-identified patent and that said Letters Patent is hereby corrected as shown below:

Column 3, line 54, "1/2" should be -- 2-1/2 --.

Signed and Sealed this

Twenty-first Day of June, 1988

Attest:

DONALD J. QUIGG

*Attesting Officer*     *Commissioner of Patents and Trademarks*